United States Patent [19]

Weissman et al.

[11] 3,905,829

[45] Sept. 16, 1975

[54] LEAD-ACID BATTERY PLATE WITH LOW DUSTING CHARACTERISTICS AND METHOD OF MANUFACTURE

[75] Inventors: Eugene Yehuda Weissman, Birmingham, Mich.; Basanta Kumar Mahato, Milwaukee, Wis.

[73] Assignee: Globe-Union Inc., Milwaukee, Wis.

[22] Filed: June 3, 1974

[21] Appl. No.: 475,944

Related U.S. Application Data

[63] Continuation-in-part of Ser. No. 326,873, Jan. 26, 1973, abandoned.

[52] U.S. Cl. ................................. 136/26; 136/27
[51] Int. Cl.² ................................. H01M 39/00
[58] Field of Search ......... 136/26, 27, 78, 131, 132, 136/34, 35, 120, 147

[56] References Cited
UNITED STATES PATENTS

| | | | |
|---|---|---|---|
| 2,889,388 | 6/1959 | Csapo .............................. | 136/26 X |
| 2,996,563 | 8/1961 | Haebler ............................ | 136/27 |
| 3,100,162 | 8/1963 | Sabatino et al. .................. | 136/78 |
| 3,198,665 | 8/1965 | Howell ............................. | 136/78 |
| 3,496,020 | 2/1970 | Jackson et al. ................... | 136/26 |
| 3,518,120 | 6/1970 | Lello et al. ....................... | 136/26 |
| 3,658,594 | 4/1972 | Jache ............................... | 136/26 |

*Primary Examiner*—John H. Mack
*Assistant Examiner*—C. F. Lefevour
*Attorney, Agent, or Firm*—James L. Kirschnik; John Phillip Ryan

[57] ABSTRACT

Leady dust which usually results from the handling of pasted lead-acid storage battery plates is substantially reduced by coating the surface of the pasted plate with a water soluble polymeric compound which does not interfere with the plate's electrical capabilities. Preferably, the water soluble polymeric compound is a polyvinyl alcohol, polyethylene oxide, alkyl cellulose, acrylic resins or water soluble starches which is applied either as an aqueous solution or a fine powder or film of the compound directly to the wet surface of the pasted plate. Additives such as viscosity modifiers, plasticizers, extenders and antioxidants can be added with the water soluble polymeric compound.

14 Claims, No Drawings

LEAD-ACID BATTERY PLATE WITH LOW DUSTING CHARACTERISTICS AND METHOD OF MANUFACTURE

This application is a continuation-in-part of application Ser. No. 326,873 filed Jan. 26, 1973 now abandoned.

BACKGROUND OF THE INVENTION

This invention relates to a lead-acid battery plate which is coated with a material to reduce the generation of leady dust from the plate surface. More particularly, this invention relates to the reduction of leady dust from the plate during the manufacture of the elements for lead-acid storage batteries by applying a coating of water soluble polymeric material to the surface of the pasted plate.

In the manufacture of lead-acid storage batteries, the usual procedure involves the following steps: 1. Paste mixing; 2. Pasting; 3. Flash Drying; 4. Panel Edge Scraping; 5. Plate Slitting; 6. Curing; 7. Strap Burning and Element Preparation, and 8. Cell Assembly. The source of leady dust has been acknowledged as emanating between the Flash Drying step and the Strap Burning procedure and mostly between the Flash Drying and the Curing chambers. This is due to the fact that the Flash Drying operation involves a sudden exposure of the wet pasted plate to a temperature in excess of 300°C. for 20 to 30 seconds which causes a rapid evaporation of water from the surface and the plate interior. Such steaming action carries leady particles from the plate in an entrainment action and roughens the plate surface. This operation is essential to eliminate plate stickiness and resulting difficulties in handling of the plates or panels prior to curing. Other sources of leady dust have been recognized as emanating from the edge scraping slitting and, finally, abrasion during handling. Generally, the leady fines emanating from the plates have a particle size diameter greater than 0.3 micron. Efforts have been made to reduce this undesired condition in that some battery procedures utilize sulfuric acid spray on the freshly pasted plates as well as periodic water spraying. It is also known to utilize suitable paste additives to improve plate strength. However, previous approaches have been very limited in that additives to the paste for this purpose have been known to deteriorate the electrical capabilities of the battery. (Vinal, *Storage Batteries*, 4th Ed., John Wiley & Sons, pp. 138–155) The use of vinyl resins have been indicated in U.S. Pat. No. 3,496,020 in the preparation of a lead-acid battery plate wherein the resin is mixed throughout the paste so as to effect a porous low density structure. There is not currently available a procedure for manufacturing a lead-acid storage battery plate which is substantially dust free during fabrication and at the same time has its electrical capabilities unaffected.

It has been found that dust particles usually resulting from manufacturing handling procedures of lead-acid battery plates can be reduced if the surface of the usually pasted plate wherein the paste is composed of leady paste containing free lead and compounds of lead (sulfates, oxides, basic sulfates or oxides), whether employed for the positive or the negative plate, is coated with a water soluble polymeric material. The coating of such a material after drying should be thin enough (less than 1 micron) so that it provides transmission of oxygen and water vapor for the curing process. At the same time these materials being water soluble do not interfere with the plate performance after formation as they serve as only a temporary coating on an unformed plate and are substantially washed out of the plate during formation with any trace amounts remaining not affecting the operational life of the battery. It was quite unexpected that sufficiently small amounts (thin layers) of these water soluble polymeric compounds could be utilized in this manner, as the pasted surface of the leady materials utilized to make the battery paste are very rough and the use of polymeric materials on a lead-acid battery plate from an electrical standpoint has been contra-indicated.

It is an object of the present invention to provide a novel process for reducing leady dust emanating from lead-acid storage battery plates during the manufacturing procedures of fabricating a lead-acid storage battery and a pasted plate which greatly minimizes leady dust. It is still another object of this invention to provide a method for reducing leady dust from a lead-acid battery plate as well as a unique plate structure which while reducing dust particles from emanating from the plate does not interfere with its electrical performance. It is yet another object of this invention to afford a process and a plate structure where a leady dusting is held to a minimum and which can be effected without costly capital investment or the utilization of prolonged time consuming procedures and precise control steps.

SUMMARY OF THE INVENTION

The foregoing objects are accomplished and the shortcomings of the prior art are overcome by the present process and coated, leaded electrode wherein the usual pasted grid structure is coated with a material composed of a water soluble polymeric compound. The compound is applied in some instances as an aqueous solution. It is subsequently surface dried to result in a film of the water soluble material on an unformed plate which is removed during the usual formation step. The aqueous solution can be applied as a spray or by brushing or dipping the pasted plate. An aqueous paste can also be made of the water soluble polymeric compound and applied by rolling it onto the pasted plate. Alternatively, the water soluble polymeric compound can be applied as a fine powder to the water wet surface of the pasted plate. As a still alternative procedure, self-supporting polymeric films of the water soluble polymeric compounds can be preformed and then applied to the surface of the wet pasted plates. The preferred polymeric materials are polyvinyl alcohol, polyethylene oxide, methyl cellulose and water soluble starch. However, other water soluble polymeric materials (i.e. water soluble acrylic resins and alkyl celluloses such as: hydroxy propyl cellulose) can be utilized which can be applied in thin coats and not affected electrical characteristics. Viscosity modifiers, gelling or anti-gelling compounds, plasticizers, extenders and/or antioxidants can be added to the water soluble polymeric materials during their application.

The following Examples are presented to better illustrate the invention. The Examples and Table I show how leady dusting of a pasted lead-acid storage battery plate can be controlled yet not affect its electrical activity. However, the Examples are not intended to limit the invention to the times, conditions or materials set forth. In all of the Examples, 1.50 × 1.30 × 0.060 inch size test plate with standard battery paste prepared out of ball milled leady oxides and sulfuric acid solution was used.

EXAMPLE I

A 20% by weight aqueous solution of a low molecular weight polyvinyl alcohol (PVA) having a molecular weight of 25,000–35,000 (sold under the trade name Elvanol, grade 51-05, manufactured by E. I. du Pont de Nemours & Company, Wilmington, Del.) was prepared and coated with a small paint brush over a freshly pasted positive plate at a rate of 0.10–0.20 grams of solution per square inch of plate area. The coated material was then dried on the unformed plate in a hot air stream having a temperature of 95°±5°C. for 1 minute.

EXAMPLE II

The same procedures were followed as indicated in Example I except that a 10 $^w/o$ solution of polyvinyl alcohol was prepared with water as solvent. This material was applied to a freshly pasted plate by a paint brush to the extent of 100–150 milligrams per square inch of plate surface. The treated plate was dried in a hot air streat at 95° ± 5°C. for 1 minute.

EXAMPLE III

A water solution of polyethylene oxide (sold under the trade name Polyox WSR-301 manufactured by Union Carbide, New York, N.Y.) was prepared by dissolving 0.75 gram in 100 cc of water. This solution was coated on a freshly pasted positive plate to the extent of 0.1 gram of solution per square inch of plate surface by use of a small paint brush. The composite material was dried on the unformed plate in the manner described in the previous Examples.

EXAMPLE IV

Polyethylene oxide having a molecular weight range of 100,000–4,000,000 (sold under the trade name Polyox WSR-301 manufactured by Union Carbide, New York, N.Y.) and in the form of a powder of about 200 mesh was sprayed by means of an oxygen gas pressure nozzle onto a freshly pasted plate surface to the extent of 100–150 milligrams per plate. After this application, the unformed coated plate was dried in a hot air stream at 95° ± 5°C. for 1 minute.

In the previous Examples, a 20% solution of polyvinyl alcohol was prepared in Example I and a 10% solution in Example II. Other solutions of polyvinyl alcohol obtained from Polymer Films, Inc. of Woodside, N.Y. with 18 $^w/o$ solid content with some additives which can include antigelling agent and plasticizer were also applied with a paint brush and dried in the previously indicated manner.

EXAMPLE V

Preformed films of polyvinyl alcohol, polyethylene oxide and methyl cellulose having a thickness of about 0.001 inch were wrapped around the freshly pasted positive plates in an amount of about 100–120 milligrams per plate. The film material partially dissolves on the wet plate and is subsequently dried by forced hot air for one minute with an air temperature of about 95° ± 5°C.

The polyvinyl alcohol, polyethylene oxide and methyl cellulose films are all obtainable from Polymer Films, Inc., as previously designated of Woodside, N.Y. and are sold under the trade names Quik Sol "A", Quik Sol "P" and Edisol-M, respectively.

The following Tables illustrate various tests conducted on the pasted plates prepared in accordance with this invention: Table I illustrates approximately 40–50 pasted plates prepared in accordance with Examples I–V which were dried in a hot air stream for one minute and examined for the indicated conditions; Table II illustrates the dusting tests conducted on plates prepared in accordance with Examples I and V which were cured for 72 hours at 120°F. and 100% Relative Humidity with one plate treated with the indicated material subjected to the % Free lead content test: five of each of the Surface and Touch tests and three of each to the Abrasion test and compared with an equal number of nontreated ones; Table III shows certain electrochemical tests conducted on the indicated treated and nontreated plates after formation with two plates treated with the indicated materials subjected to the three tests and compared with an equal number of nontreated plates, the water soluble materials having been removed during formation; and Table IV shows a specific chemical analysis of the electrolyte samples after about 10 discharge-charge cycles and 72 hours continuous overcharge at 40 mA employed in conjunction with one cell each of the indicated treated and untreated plates. Table IV illustrates that any trace amount of the soluble coating material contained in the electrolyte after substantial removal during formation does not generate acetic acid during cycling and constant current overcharge operation.

TABLE I

| Conditions | Treated Plate | Nontreated Plate |
|---|---|---|
| Surface: | dry | wet |
| Stickiness: | no | yes |
| Handling characteristics: | good | moderate to bad |

TABLE II

| Conditions | Plate Treated With Quik Sol A, Quik Sol P Film and PVA-Solution | Nontreated Plate |
|---|---|---|
| % Free lead content (in cured positive plate): | <5% | <5% |
| Surface appearance: | Rough & glossy (film was a part of the surface texture but not detected by microscope 80 ×) | Rough & fragile |
| Touch test: | No leady dust | Leady dust |
| Abrasion test: | <0.063 mg/plate | >1.600 mg/plate |

TABLE III

| Conditions | Plate Treated with Quik Sol A, Quik Sol P Film and PVA-Solution | Nontreated Plate |
|---|---|---|
| Positive electrode potential at the end of formation: | 1.34 V (vs Hg/Hg$_2$SO$_4$) | 1.34 V (vs Hg/Hg$_2$SO$_4$) |

TABLE III — Continued

| Conditions | Plate Treated with Quik Sol A, Quik Sol P Film and PVA-Solution | Nontreated Plate |
| --- | --- | --- |
| Capacity at 40 mA rate: | Quik Sol P: 0.92 A-hr<br>Quik Sol A: 0.77 A-hr<br>PVA-Solution: 0.88 A-hr | 0.86 A-hrs |
| Capacity at 2A, 0°F: | Quik Sol P film: 359 seconds<br>PVA-Solution: 293 seconds | 367 seconds |

TABLE IV

| Conditions | Plate Treated with Quik Sol A, Quik Sol P Film and PVA-Solution | Nontreated Plate |
| --- | --- | --- |
| Nuclear Magnetic Resonance Analysis for acetic acid: | nil | nil |

In the previous Examples, solutions for coating the pasted plates were composed from polyvinyl alcohol, polyethylene oxides as well as films of these materials including methyl cellulose. It should be understood that aqueous solutions of methyl cellulose and other alkyl celluloses (i.e. hydroxy propyl cellulose) having specific gravities in a range such as 1.10–1.30, are also operable on unformed plates. In addition, water soluble starches such as high amylose corn starch are operable within the designated ranges (specific gravities 1.10–1.30) and conditions shown in the Examples. While aqueous solutions of polyvinyl alcohol and polyethylene oxide have been indicated as being from 0.75% to 20%, it should be understood that other higher and lower concentrations of solutions depending on the molecular weight of the polymer can be employed to advantage. In a similar manner, polyvinyl alcohol powder as well as other water soluble polymeric powders can be employed in the powder form as a spray onto the moist plate surface. Furthermore, water-soluble polymeric films can be applied to the moist plate surface.

Caution should be employed so as not to employ a surface drying temperature more than 100°C. when employing the coating solutions of this invention as an insoluble film could form on the battery plate which is not removed during the forming procedure. Further, the use of excessive thick coating film on the plate surface should be avoided and a maximum of about 0.2 grams per square inch of plate area should not be exceeded.

Measurement of surface strength for the dust releasing capacity of the pasted plates as indicated in Table II was accomplished by the use of a nylon brush wherein a cured plate is forced underneath the brush and the brush head is connected to an electric drill and rotated at 500 rpm for 15 seconds. During this period, air samples are drawn from the chamber at a rate of 2.00 standard cubic feet per minute and through a glass microporous filter paper.

In the preceding Examples, positive plates were utilized for coating with the various water soluble polymeric compounds. It should be understood that these coating materials are equally effective when treating the wet paste on a standard negative plate. Also where conditions indicate, viscosity modifying gelling or antigelling compounds, plasticizers, extenders and/or antioxidants can be employed with the various solutions as will be apparent to one skilled in the art. For example, boric acid can be utilized as a gelling agent; glycerine, polyethylene glycol and similar type materials can be employed as plasticizers; starch and calcium carbonate and like materials can be employed as extenders, and phenolic compounds and boric acid as antioxidants.

In Example IV, granular powdered polyethylene was sprayed onto a pasted plate. It is envisioned that the same powdered material or an aqueous solution of it could be applied by means of a roller system on a continuous basis as the plates are pasted and pass from an automatic pasting machine.

It will thus be seen that through the present invention, there is now provided a method for controlling leady dust from pasted lead battery plates which can employ readily available materials yet will not interfere with the electrochemistry of the pasted electrode. No major change need be made in the present manufacturing methods for fabricating lead-acid storage batteries and any expense for treatment can be partially offset by energy savings inherent in the use of reduced temperature during the flash drying step which can be reduced from 300°C. to about 100°C. and preferable 95° ± 5°C. A pasted plate is provided by the present method which is not only relatively dust-free but also has superior handling characteristics. The unformed coated plate is easily cured yet readily formed with removal of the coating material during the formation and without interference with its formation.

The foregoing art can now be practiced by those skilled in the art. Such skilled persons will know that the invention is not necessarily restricted to the particular embodiments herein. The scope of the invention is to be defined by the terms of the following claims as given meaning by the preceding description.

We claim:

1. A substantially dust-free unformed leaded plate for lead-acid storage batteries comprising leady paste applied to a supporting grid structure and a water soluble coating covering the surface of said leady paste in a thin layer composed of a water soluble film forming polymeric compound.

2. The leaded plate as defined in claim 1 wherein said coating is composed of polymerized polyvinyl alcohol.

3. The leaded plate as defined in claim 1 wherein said coating is composed of polymerized polyethylene oxide.

4. The leaded plate as defined in claim 1 wherein said coating is composed of polymerized water soluble alkyl celluloses.

5. The leaded plate as defined in claim 1 wherein said coating is composed of a water soluble starch.

6. The coated leaded plate as defined in claim 1 further including a viscosity modifying agent.

7. The coated leaded plate as defined in claim 1 further including a plasticizing agent.

8. The coated leaded plate as defined in claim 1 further including an extending agent.

9. The coated leaded plate as defined in claim 1 further including an antioxidant agent.

10. A method of reducing leady dust from a plate for leadacid storage batteries comprising pasting a supporting grid with a leady paste material to compose said plate, applying to said pasted plate a thin layer of a coating of a water soluble film forming polymeric compound, drying said coating material to result in a water soluble film of said polymeric compound, and removing substantially all of said water soluble film during formation of said plate.

11. The method as defined in claim 10 wherein said coating material is applied as an aqueous solution of the water soluble film forming polymeric compound.

12. The method as defined in claim 10 wherein said pasted plate is in an aqueous-wet condition and said water soluble polymeric compound is applied as a fine powder.

13. The method as defined in claim 10 wherein said coating material is applied by immersing said pasted plate into an aqueous solution of the water soluble polymeric material.

14. The method as defined in claim 10 wherein said coating material is applied in the form of a self-supporting film.

* * * * *